United States Patent
Bansemir

[19]

[11] Patent Number: 6,039,538

[45] Date of Patent: Mar. 21, 2000

[54] MULTI-BLADE ROTOR FOR A HELICOPTER

[75] Inventor: Horst Bansemir, Munich, Germany

[73] Assignee: Eurocopter Deutschland GmbH, Munich, Germany

[21] Appl. No.: 09/005,551

[22] Filed: Jan. 12, 1998

[30] Foreign Application Priority Data

Jan. 17, 1997 [DE] Germany .......................... 197 01 403

[51] Int. Cl.[7] ................................................. B64C 27/33
[52] U.S. Cl. ..................... 416/134 A; 416/140; 416/141; 416/230 A; 416/244 R
[58] Field of Search ................................ 416/134 A, 140, 416/141, 138, 106, 107, 230 A, 244 R

[56] References Cited

U.S. PATENT DOCUMENTS

| | | |
|---|---|---|
| 4,182,597 | 1/1980 | Derschmidt . |
| 4,345,876 | 8/1982 | Schwarz et al. ..................... 416/134 A |
| 4,352,631 | 10/1982 | Buchs et al. . |
| 4,369,018 | 1/1983 | Brunsch et al. . |
| 4,568,244 | 2/1986 | Wehnert et al. . |
| 5,263,821 | 11/1993 | Noehren et al. . |

FOREIGN PATENT DOCUMENTS

8704402 7/1987 WIPO .

Primary Examiner—Christopher Verdier
Attorney, Agent, or Firm—W. F. Fasse; W. G. Fasse

[57] ABSTRACT

A multi-blade rotor arrangement free of flapping hinges, for a rotary wing aircraft, includes a rotor head plate (2) made of fiber-reinforced composite material. The head plate (2) includes a plurality of blade connection arms (4) that are elastically flexibly bendable in the blade flapping direction, and at least one plate segment (16, 18) that holds each blade connection arm on two sides thereof radially spaced away from the rotor center in a manner that allows elastic bending in the blade flapping direction. The plate segment is rigidly connected to the rotor mast (122, 222) at mounting locations (20) that are offset in the circumferential direction from the blade connection arms. In this manner, the elastically yielding flapping connection between the rotor blades and the rotor mast is provided by both the elastic bending of the blade connection arms and the elastic deformation of the plate segment portions between the blade connection arms and the mast mounting locations. The fictitious flapping hinges formed thereby may be located relatively close to the rotor center, namely spaced away from the rotor center by about 5% of the rotor radius.

28 Claims, 4 Drawing Sheets

MULTI-BLADE ROTOR FOR A HELICOPTER

PRIORITY CLAIM

This application is based on and claims the priority under 35 U.S.C. §119 of German Patent Application 197 01 403.8, filed on Jan. 17, 1997.

FIELD OF THE INVENTION

The invention relates to a multi-blade rotor arrangement free of flapping hinges, for a rotary wing aircraft such as a helicopter. The rotor arrangement includes a fiber-reinforced composite rotor head plate that is rigidly connected to the rotor mast and that includes blade connection arms which are elastically flexible in the blade flapping direction.

BACKGROUND INFORMATION

Rotor arrangements of the above mentioned general type that are free of flapping hinges are known in the art, for example as disclosed in U.S. Pat. No. 5,263,821. Such rotor arrangements generally include a centrally located, very stiff and rigid plate component of fiber-reinforced composite material that is rigidly connected to the rotor mast. The plate component is provided with blade connection arms that are integrally formed on the plate component and extend radially outwardly therefrom. The blade connection arms form the effective or fictitious flapping hinges and therefore must be embodied with sufficient flexibility or bending elasticity. However, in order that the blade connection arms surely and reliably withstand the high bending moments as well as the transverse and centrifugal force loads that arise during operation of the rotor, the blade connection arms must have a large bending length. As a result, disadvantageously, the fictitious flapping hinges are located relatively far from the center point or axis of the rotor, namely at a spacing of approximately 10% of the rotor radius away from the rotor center, and therefore, very interfering and dangerous vibrations arise in the rotor arrangement and in the helicopter during flight.

It is also known in the art, for example from the International Patent Publication WO 87/04402 and U.S. Pat. No. 4,568,244, to embody the blade connection arms separately from the stiff and rigid rotor head plate, and instead to supportingly connect the blade connection arms to the rotor head plate in a manner allowing flapping angle movement, using elastomeric bearings arranged relatively close to the rotor axis, for example. Such an arrangement allows the spacing of the flapping hinges away from the rotor center to be reduced to a desired dimension, namely for example approximately 5% of the rotor radius, and thereby allows interfering vibrations caused within the rotor to be substantially suppressed. On the other hand, such a rotor arrangement is structurally very complicated and costly, and very sensitive to wear, so that it can only meet the requirements of robust reliability and low maintenance in very limited circumstances.

SUMMARY OF THE INVENTION

In view of the above, it is an object of the invention to provide a multi-blade rotor arrangement of the above mentioned general type, in which the blade connection arms are provided or arranged on the rotor head plate in a structurally simple, yet surely and reliably load-carrying manner, without an interposed flapping motion hinge or bearing, while still achieving a very small spacing between the fictitious flapping hinges and the rotor center. The invention further aims to avoid or overcome the other disadvantages of the prior art, and to achieve additional advantages, as apparent from the present description.

The above objects have been achieved in a multi-blade rotor arrangement free of flapping hinges, according to the invention, including a rotor head plate made of a fiber composite material that is rigidly mounted on the rotor mast and that is provided with blade connection arms that are flexible or elastically bendable in the blade flapping direction. Especially according to the invention, the rotor head plate comprises at least one plate segment that holds each blade connection arm from two sides thereof at a radial spacing away from the rotor center, in a manner that is elastically flexible in the blade flapping direction. Furthermore, securing or mounting elements, such as mounting holes, for mounting the rotor head plate on the rotor mast are provided on the at least one plate segment at positions offset in the circumferential direction from the positions of the blade connection arms. The at least one plate segment provides a suspension under tension for supporting the blade connection arms relative to the mounting elements.

The invention further advances and develops the concept of a flexible rotor head plate, in that the plate segment portions laterally supporting the blade connection arms are also utilized, in addition to the blade connection arms themselves, for carrying out the bending deformation necessary for allowing the blade flapping motions. The blade connection arms are supported, restrained, and connected to the rotor mast, only by the plate segments. Thereby, for achieving the flapping bending, the radial bending length of the blade connection arms is effectively increased by the circumferential deformable length of the plate segments, so that the effective or fictitious bending hinge areas can be moved substantially closer to the rotor center, namely to a spacing of not more than and preferably equal to approximately 5% of the rotor radius, without negatively influencing the load carrying strength. In this manner, the invention achieves a vibration characteristic that is as advantageous as in known rotor constructions using blade connection arms that are separate from the rotor head plate, but connected thereto in a flapping movable manner by a hinge or bearing member. Moreover, the invention uses a construction that is considerably simpler and, most importantly, that is functionally more reliable than such prior art arrangements.

In order to provide a structural redundancy of the circumferential deformation zones of the rotor head plate, in a preferred embodiment, the rotor head plate is divided into a plurality of plate segments that are radially spaced from one another relative to the rotor center. For example, the rotor head plate may include plate segments forming two concentric rings, e.g. radially inner and radially outer circular rings, or radially inner and radially outer polygonal shaped rings such as square shaped rings, as will be discussed further below. In an embodiment having an especially advantageous load-carrying strength and flexibility, the inner plate segment is preferably a continuous, closed or solid, fiber-reinforced composite material plate component that connects together the blade connection arms radially to the rotor center in an elastically bendable manner.

Generally in prior art helicopter rotor arrangements, dampers or shock absorbers effective in the lead-lag direction had to be arranged externally of the rotor head plate for reasons of space and complexity of the rotor head structure. However, according to a particularly advantageous installation embodiment of the present invention, lead-lag dampers may be incorporated within the interior region of the rotor head plate. Namely, the lead-lag dampers may be arranged and connected between the respective blade connection arms and one of the plate segments. In this case, preferably the respective plate segment includes two plate segment members spaced apart or stacked above one another in the rotor axial direction, and the respective blade connection arms are received between the two plate segment members with respective elastomeric dampers interposed between each blade connection arm and the plate segment members. In this manner, a highly effective lead-lag damping as well as a very secure and reliable load carrying connection in the flapping direction is achieved between the respective blade connection arms and the plate segment.

In order to increase the flapping elasticity or flexibility of the combined blade connection arms and plate segments, the plate segments are embodied to be elastically flexibly bendable and/or torsionally elastic about an axis perpendicular to the flapping plane. In an embodiment using torsionally elastic plate segments, these segments are preferably stiff against transverse forces in the rotor rotational plane and in directions perpendicular thereto. This construction achieves a substantially deformation resistant and stable transmission of the high transverse forces introduced by the rotor blades into the blade connection arms, and from there through the plate segments to the mounting locations for mounting the rotor hub plate to the rotor mast.

Preferably, at least one of the plate segments is formed integrally with the blade connection arms, so as to have a unitary, integral, continuous fiber structure between and through this plate segment and the blade connection arms. Such an integral or unitary construction achieves manufacturing advantages, but primarily also achieves good strength characteristics.

Both the cross-sectional geometry and the plan view or surface shape of the plate segments may be varied or selected among a wide range of possibilities depending on the elasticity and strength characteristics required in a particular application. In the simplest case, one or more annular, circular plate segments are arranged to form one or more circular rings concentrically about the rotor center. Another form that is particularly strong and well adapted to fiber composite manufacturing includes one or more plate segments arranged in a polygon shape having a number of straight polygon sides corresponding to the number of rotor blades in the rotor arrangement. Preferably, the mounting locations for mounting or securing the rotor head plate to the rotor mast are arranged at the corners of the polygon shape, while the blade connection arms are respectively arranged at the mid-points of the respective straight polygon sides.

A carbon fiber-reinforced composite material is the preferred material for the rotor head plate, including the plate segments and the blade connection arms, in view of the advantageous material properties thereof.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
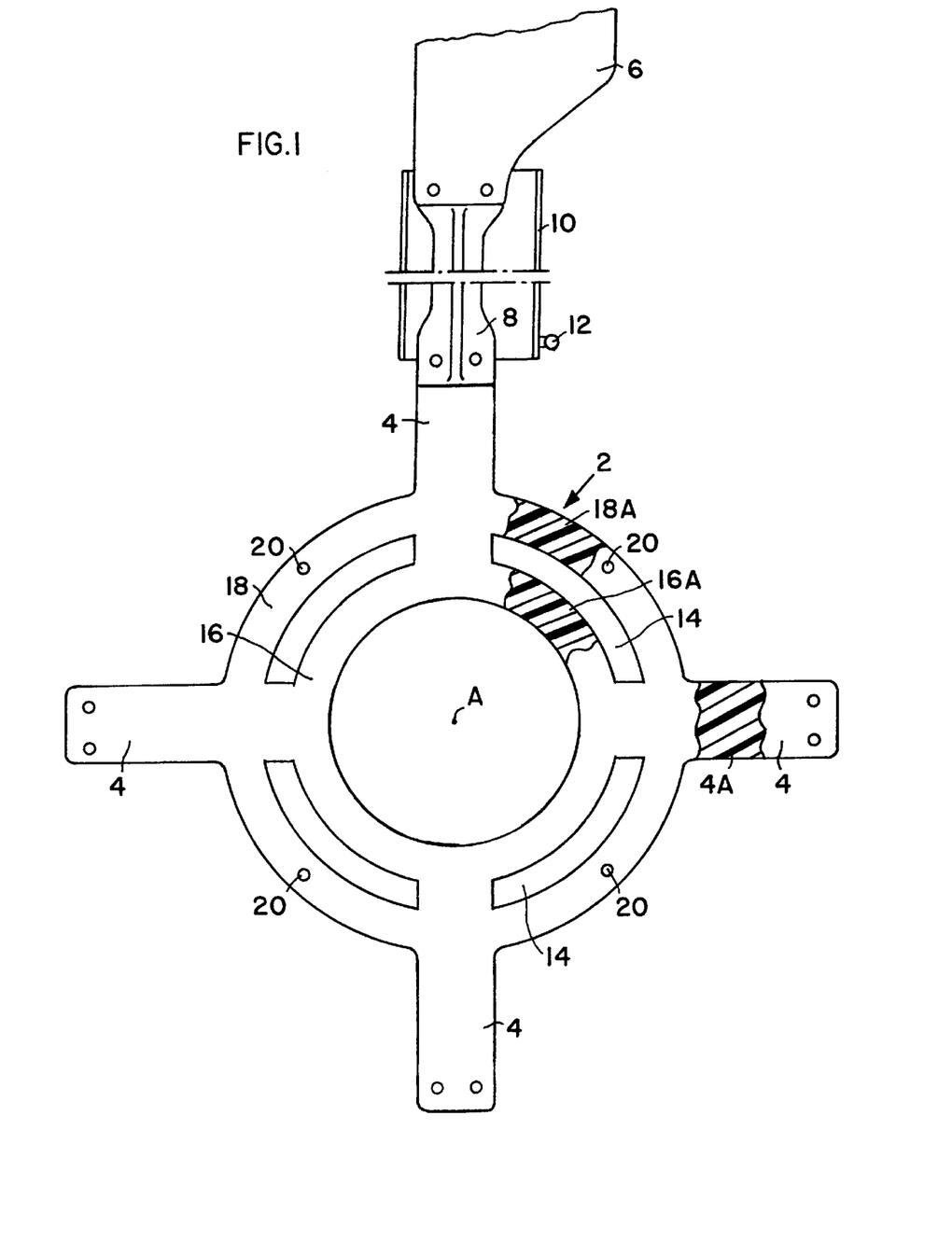
FIG. 1 is a schematic plan view of a four-bladed rotor arrangement according to the invention, with a flexible rotor head plate including plate segments arranged in concentric circular rings and integrally formed blade connection arms, made of fiber-reinforced composite material.

FIG. 1 shows a four-bladed rotor arrangement including a flexible rotor head plate 2 made of fiber-reinforced composite material and including integrally formed blade connection arms 4 protruding radially outwardly therefrom. Four rotor blades 6 (of which only one is shown for simplicity in FIG. 1) are connected in any known manner respectively to the four blade connection arms 4 by means of intermediate connection elements 8 that are elastically flexible in torsional and lead-lag directions. In order to allow the controlled torsion or twisting of the intermediate connection elements 8 for adjusting the blade pitch angle, a torsionally stiff control sleeve 10 is arranged and connected in a typical manner. Namely, the control sleeve 10 is torsionally rigidly connected to the blade root end of the rotor blade 6, and includes a control horn or lever arm 12 by which blade pitch adjustment commands are received and introduced into the rotor blade 6.

Since the present rotor arrangement is free of flapping hinges or flapping journal bearings, the rotor head plate 2 is flexibly embodied so as to form effective or fictitious flapping hinges. More particularly, the blade connection arms 4 are embodied to be elastically bendable or flexible in the flapping direction, and the rotor head plate 2 is separated by arc-shaped slots 14 into a radially inner plate segment 16 (or four arc shaped segments forming a continuous ring) and a radially outer plate segment 18 (or four arc shaped segments forming a continuous ring) arranged concentrically about the rotor center and having substantially flat rectangular cross-sectional shapes. The ring-shaped plate segments 16 and 18 interconnect the blade connection arms 4 in the rotor circumferential direction, and hold the radially inner ends of the blade connection arms 4 at a radial spacing away from the rotor center A. In other words, the blade connection arms 4 do not interconnect or extend continuously through the rotation center A of the rotor, so that the rotor plate 2 has a hole at the rotation center A. Mounting locations 20, which may include simple mounting holes, reinforced mounting holes or flanges, and/or mounting devices such as bolts, threaded nuts, washers, rivets, spacers, mounting brackets or any other known mounting components, for mounting the rotor head plate 2 rigidly on the rotor mast, are arranged on the radially outer plate segment 18 at positions offset in the rotor circumferential direction from the blade connection arms 4. Preferably, the mounting locations 20 are respectively arranged at positions mid-way between respective neighboring blade connection arms 4.

With this arrangement, a flapping motion of the rotor blades 6 is transmitted into the rotor head plate 2 not only as an elastic bending deformation of the radially extending blade connection arms 4, but also as a deformation of the circumferentially extending plate segments 16 and 18 up to the mounting locations 20 at which the head plate 2 is rigidly connected to the rotor mast. The deformations of the plate segments 16 and 18 may include torsional deformations of the segments 16 and 18 about the circumferential extension thereof, and/or elastic bending deformations in a direction perpendicular to the rotor blade rotational plane. In this manner, the effective flexible length of the connection between the rotor blade 6 and the rotor mast is increased beyond the length of the blade connection arms 4, and it thus becomes possible to move the locations of the fictitious flapping hinges very close to the rotor center A, namely to approximately 5% of the rotor radius, while still being able to embody the rotor head plate 2, including the blade connection arms 4, as a one-piece integral fiber-reinforced composite component having a high strength. The fiber composite material is preferably a carbon fiber-reinforced composite having a multi-axial fiber layer construction, as is schematically indicated in FIG. 1 by hatch markings 4a, 16a, 18a extending in different directions in different plate portions or areas.

Figure 2:
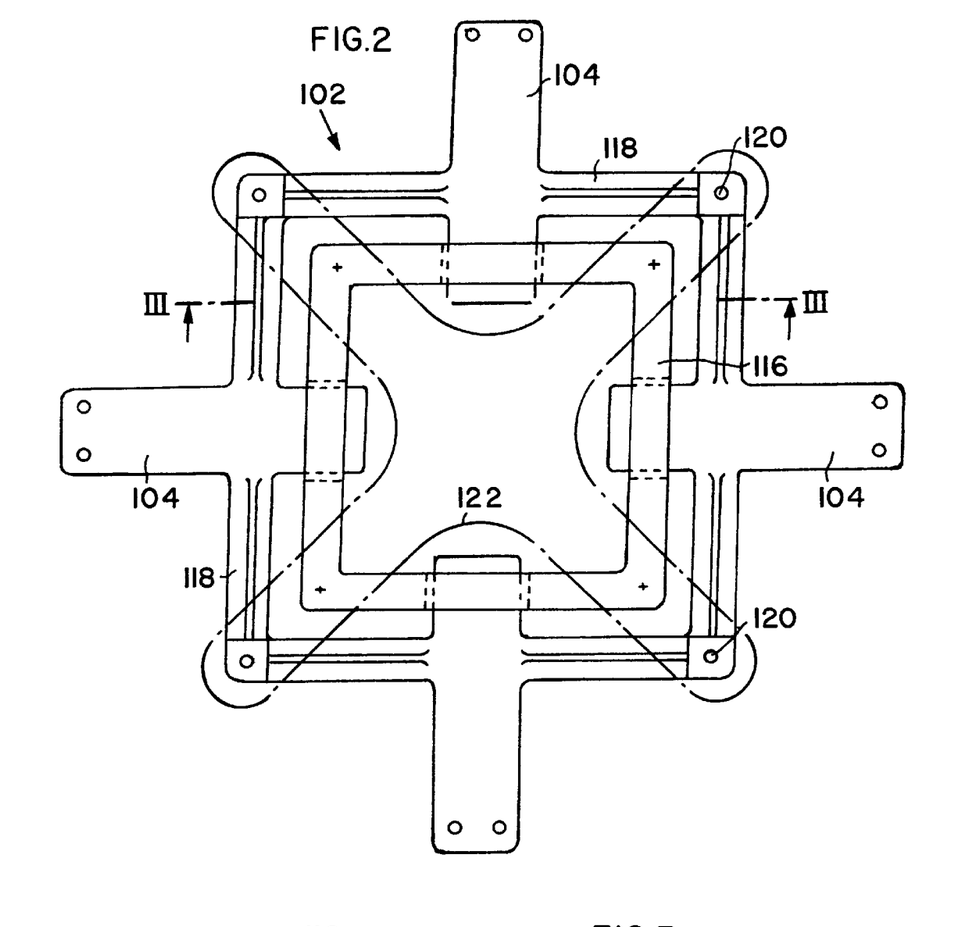
FIG. 2 is a schematic plan view of a second embodiment of a flexible rotor head plate having integrated lead-lag dampers, according to the invention.

FIG. 2 shows another embodiment of a four-bladed rotor construction according to the invention, in which components generally corresponding to the first embodiment are identified by reference numbers that are greater by 100 than the corresponding reference numbers in FIG. 1. The present second embodiment differs from the first embodiment primarily through a different plan shape and cross-sectional geometry of the plate segments 116 and 118, as well as by incorporation of a lead-lag damping arrangement into the flexible rotor head plate 102. In the present embodiment, the two plate segments 116 and 118, as shown in the plan view of FIG. 2, are in the form of two square rings arranged concentrically to one another and to the rotor center or axis A. The four blade connection arms 104 are respectively arranged at the mid-points of the straight sides of the square plate segments 116 and 118, while the rotor mast mounting locations 120 are positioned at the corner points of the outer plate segment 118.

The rotor mast 122 has a cross-shaped or four-pointed star-shaped cross-section and ends slightly below the rotor head plate 102, in order to provide the free space necessary for the elastic deformation of the rotor head plate 102 for the blade flapping motions. It should be noted that a similar structure and interconnection of the rotor mast with the rotor head plate also applies for the above first embodiment shown and discussed in connection with FIG. 1. Moreover, the cross-shaped cross-section 122 may be provided by a rigid intermediate mounting member that interconnects the rotor head plate to the rotor mast, rather than by the rotor mast directly.

Figure 3:
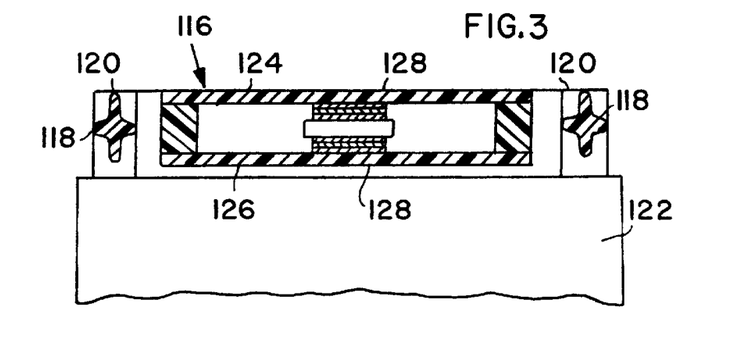
FIG. 3 is a schematic cross-sectional view along the line III—III shown in FIG. 2.

Between the blade connection arms 104 and the mounting locations 120, the outer plate segment 118 is embodied so as to be torsionally soft or flexible, yet stiff against transverse forces in the rotor rotational plane and a direction perpendicular hereto. One possible example of a physical structural configuration for achieving this is represented by the cross-shaped cross-sectional geometry of the plate segment 118 as shown in FIG. 3.

The radially inner plate segment 116 in this embodiment comprises an upper plate member 124 and a lower plate member 126, which are rigidly connected to one another and which extend over and receive therebetween the respective radially inner ends of the blade connection arms 104, with respective elastomeric dampers 128 interposed between the upper side of the blade connection arm 104 and the lower side of the upper plate member 124 on the one hand, and between the lower side of the blade connection arm 104 and the upper side of the lower plate member 126 on the other hand. This arrangement is especially shown in FIG. 3. Each elastomeric damper 128 is effective for damping in the lead-lag direction and comprises a plurality of alternating elastomeric layers and stiff interlayers stacked on top of one another. Also in this second embodiment, just as in the first embodiment, the fictitious flapping hinges are formed not only by the elastic bending flexibility of the blade connection arms 104 in the flapping direction, but also additionally by the elastic deformation of the plate segments 116 and 118, which may include torsional and bending deformations, that are caused by the flapping motion of the rotor blades.

Figure 4:
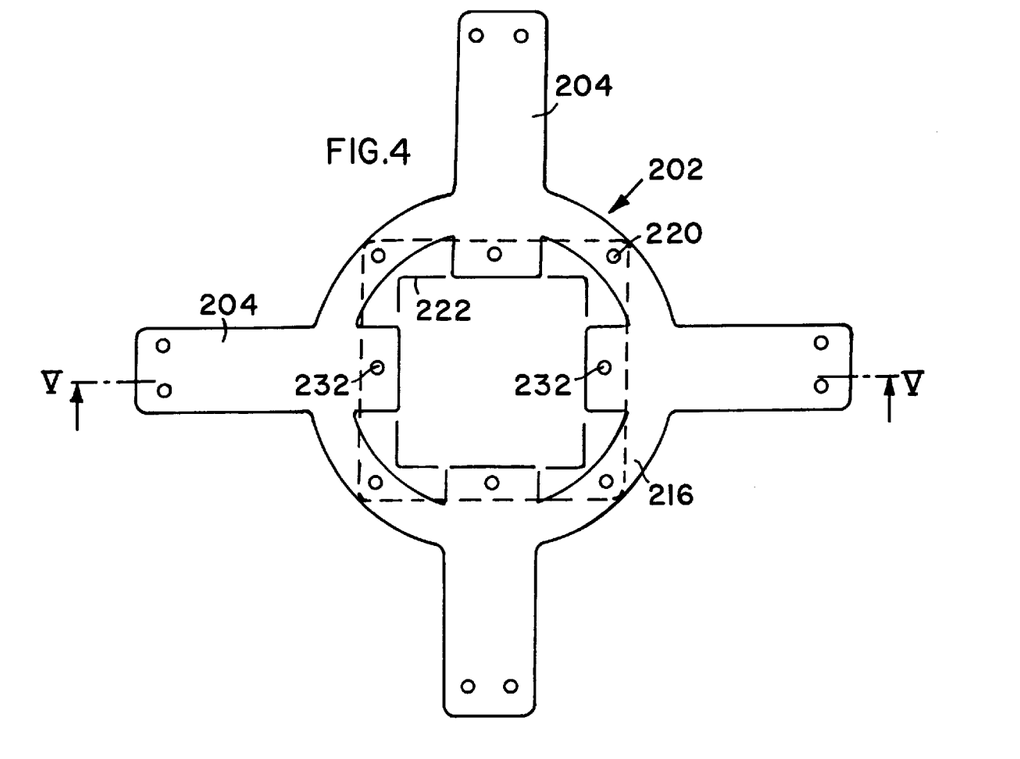
FIG. 4 is a schematic plan view of a third example embodiment of a four-bladed rotor head plate essentially comprising a single flexible plate segment integrally connecting the blade connection arms with each other, according to the invention.
Figure 5:
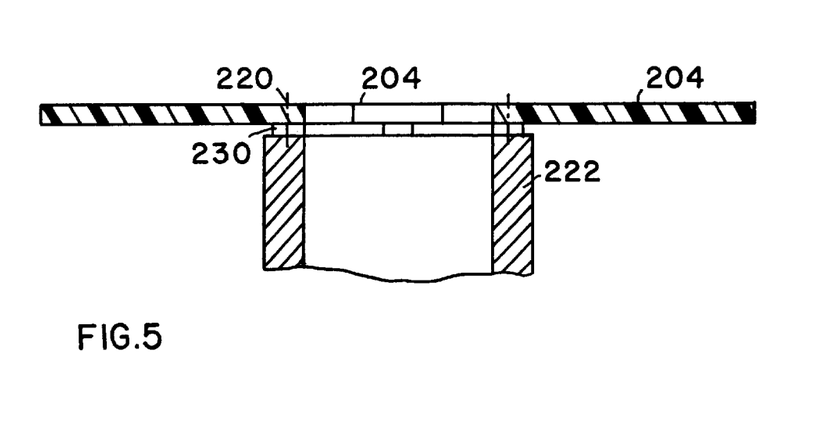
FIG. 5 is a schematic cross-section along the line V—V shown in FIG. 4.

In the third embodiment as shown in FIGS. 4 and 5, the structural components corresponding to those of the first embodiment are designated by reference numbers that are respectively increased by 200 relative to the corresponding reference numbers used in FIG. 1. In the present embodiment, the flexible rotor head plate 202 comprises a single circular ring-shaped plate segment 216 (or four segments forming a ring) arranged concentrically about the rotor center or axis A. The blade connection arms 204 are integrally formed as one piece, having a continuous through-going fiber structure, with the ring-shaped plate segment 216, to complete the flexible rotor head plate 202.

Mounting locations 220 for mounting the head plate 202 onto the rotor mast 222 are once again provided at locations on the plate segment 216 spaced circumferentially approximately in the middle between respective neighboring blade connection arms 204. As shown in FIG. 5, the plate segment 216 is mounted on the upper end of the square-section rotor mast 222 with spacer members 230 interposed therebetween. Moreover, additional mounting locations 232 are provided at the radially inner ends of the blade connection arms 204, whereby the arms 204 are also connected directly to the rotor mast 222. The additional connection provided via the additional mounting locations 232 may be omitted if greater bending flexibility is required.

Once again in this embodiment, the flapping elastic rotor blade connection is provided by the flapping elastic bending of the blade connection arms 204 and additionally by the elastic deformation of the plate segment 216 between the blade connection arms 204 and the mast mounting locations 220. As a result, the fictitious flapping hinges may be located at positions close to the rotor axis A, namely at a spacing of approximately 5% of the rotor radius away from the rotor axis A.

The present inventive multi-blade rotor arrangement is not limited to the four-bladed arrangement of the example embodiments, but rather is also applicable to other arrangements having any desired even or odd number of rotor blades. Moreover, the plan form of the plate segments is not limited to the above described circular or square plan forms, and the cross-sectional geometry of the plate segments is not limited to the above described cross-shaped or rectangular cross-section, but rather may be embodied in any shape that achieves the strength and elasticity required of the flexible plate segments in any particular application.

Figure 6:
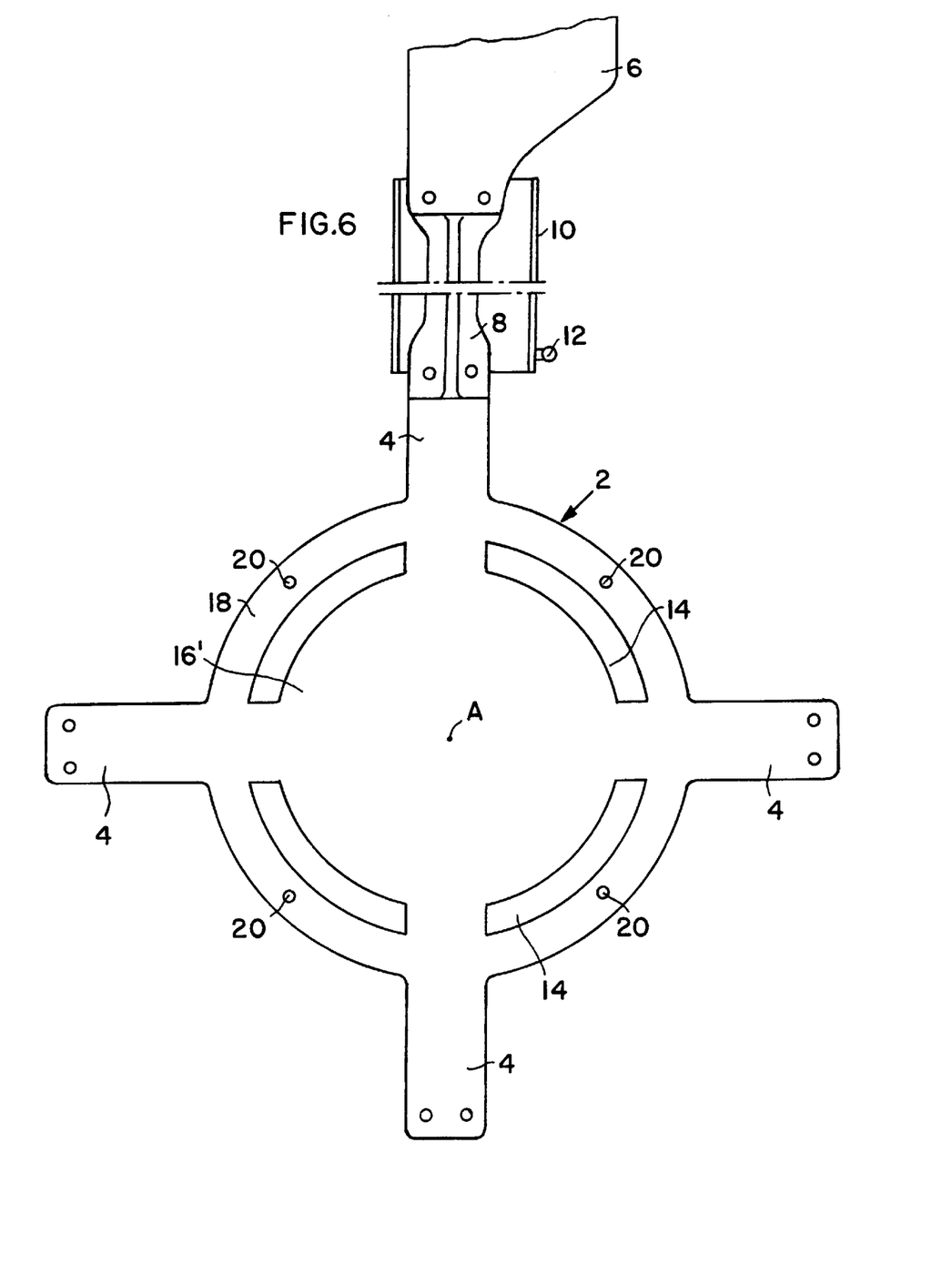
FIG. 6 is a schematic plan view of a variant embodiment of a rotor head plate including a solid central plate without a central opening.

FIG. 6 shows a further variation within the scope of the invention, in which the inner plate segment 16' is a continuous, closed or solid, flexible fiber-reinforced composite plate 16', rather than an annular plate segment 16 having a central opening as in the embodiments described above e.g. in connection with FIG. 1. Otherwise, the embodiment of FIG. 6 corresponds to that of FIG. 1, and the respective corresponding components are labelled with the same reference numbers. The mast mounting locations are locally limited areas at which the rotor head plate is rigidly mounted to the rotor mast using one or more mounting or securing elements such as bolts or the like, or even mounting brackets, spacer members or the like.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In a rotary wing aircraft including a rotor mast rotatable about a rotor axis and a plurality of rotor blades, and excluding a flapping hinge journal, an improved rotor arrangement comprising a rotor head plate that is made of at least one fiber-reinforced composite material and that comprises a plurality of blade connection arms and at least one plate segment, wherein:

said blade connection arms are connected respectively to the rotor blades and are elastically flexible for bending in a blade flapping direction, said at least one plate segment is connected to and supports said blade connection arms respectively from two sides of each said blade connection arm in a plane perpendicular to the rotor axis at locations radially spaced from the rotor axis, and said at least one plate segment is elastically flexible and arranged in such a manner so that said blade connection arms are supported by said at least one plate segment and are free to elastically bend in said blade flapping direction as said at least one plate segment elastically flexes in a manner of at least one of bending and torsional twisting, said at least one plate segment includes mounting locations positioned respectively circumferentially offset from said blade connection arms, and said rotor head plate is rigidly connected to the rotor mast via said mounting locations.

2. The improved rotor arrangement of claim 1, further comprising a plurality of intermediate connection elements that are each elastically flexible to torque and to bending in a blade lead-lag direction, wherein said intermediate connection elements respectively connect radially inner ends of the blades with radially outer ends of said blade connection arms.

3. The improved rotor arrangement of claim 1, wherein the only connection of said rotor head plate to the rotor mast is provided via said mounting locations.

4. The improved rotor arrangement of claim 1, wherein said at least one plate segment provides a suspension under tension for supporting said blade connection arms relative to said mounting locations.

5. The improved rotor arrangement of claim 1, wherein said at least one plate segment comprises a plurality of plate segments that are arranged concentrically and radially spaced from one another about the rotor axis.

6. The improved rotor arrangement of claim 1, wherein said at least one plate segment has such a structure and configuration that it is torsionally flexible, and relatively stiff against transverse forces effective in a rotational plane of the rotor blades and transverse forces effective in a direction perpendicular to the rotational plane.

7. The improved rotor arrangement of claim 1, wherein said at least one plate segment comprises a cross-shaped cross-sectional configuration.

8. The improved rotor arrangement of claim 1, wherein said at least one plate segment comprises two circular ring-shaped plate segments arranged concentrically about the rotor axis.

9. The improved rotor arrangement of claim 1, wherein said at least one plate segment comprises two plate segments each respectively having a polygon shape with a number of straight polygon sides corresponding to the number of the plurality of rotor blades, said mounting locations are respectively positioned at corner junctions between adjacent ones of said straight polygon sides, and said blade connection arms are connected to said plate segments respectively at mid-points of said straight polygon sides.

10. The improved rotor arrangement of claim 1, wherein said fiber-reinforced composite material is a carbon fiber-reinforced composite material.

11. The improved rotor arrangement of claim 1, wherein said blade connection arms are adapted to bend and said at least one plate segment is adapted to undergo said at least one of bending and torsional twisting, so as to together form fictitious flapping hinges for allowing flapping motions of the rotor blades, and wherein an effective location of said fictitious flapping hinges is radially spaced from the rotor axis by not more than 5% of a radius of the rotor blades about the rotor axis.

12. The improved rotor arrangement of claim 1, wherein said blade connection arms are entirely supported by said at least one plate segment, are restrained only by said at least one plate segment, and are connected to the rotor mast only via said at least one plate segment.

13. The improved rotor arrangement of claim 1, wherein said at least one plate segment comprises at least one annular arc-shaped plate segment.

14. The improved rotor arrangement of claim 1, wherein said blade connection arms respectively have radially inner terminal ends that are radially spaced away from the rotor axis.

15. The improved rotor arrangement of claim 1, wherein respective ones of said blade connection arms that are diametrically opposed to each other around the rotor axis are not continuous with one another and are not connected with one another along a radial line passing through the rotor axis.

16. The improved rotor arrangement of claim 15, wherein each respective single one of said blade connection arms is connected only to a respective single one of the rotor blades and to said at least one plate segment.

17. A rotor head plate for connecting a plurality of rotor blades to a rotor mast of a rotary wing aircraft, said rotor head plate being made essentially of a fiber-reinforced composite material and comprising a circular or polygon-shaped annular first ring member and a plurality of blade connection arms supported by and extending radially outwardly from said first ring member, wherein said first rind member is elastically flexible and arranged to allow flexing thereof as said blade connection arms undergo blade flapping motions, wherein radially outer ends of said blade connection arms comprise blade connection locations adapted to have the rotor blades respectively connected thereto, and wherein said first ring member comprises, at positions circumferentially offset from said blade connection arms, rotor mounting locations at which said first ring member is adapted to be rigidly connected to the rotor mast.

18. The rotor head plate of claim 17, wherein said first ring member has a cross-sectional configuration that makes said first ring member relatively flexible to torsion about its circumferential extension direction and relatively stiff against transverse forces in a major plane of said rotor head plate and perpendicular thereto.

19. The rotor head plate of claim 17, wherein said first ring member has a circular shape.

20. In a rotary wing aircraft including a rotor mast rotatable about a rotor axis and a plurality of rotor blades, and excluding a flapping hinge journal, an improved rotor arrangement comprising a rotor head plate that is made of at least one fiber-reinforced composite material and that comprises a plurality of blade connection arms and a plurality of plate segments radially spaced from one another about the rotor axis, wherein:

said blade connection arms are connected respectively to the rotor blades and are elastically flexible for bending in a blade flapping direction, said plate segments are connected to and support said blade connection arms respectively from two sides thereof radially spaced from the rotor axis, so that said blade connection arms are free to elastically bend in said blade flapping direction, a radially inner one of said plate segments is an overall closed and continuous, elastically flexible plate of said fiber-reinforced composite material, at least one of said plate segments includes mounting locations positioned respectively circumferentially offset from said blade connection arms, and said rotor head plate is rigidly connected to the rotor mast via said mounting locations.

21. In a rotary wing aircraft including a rotor mast rotatable about a rotor axis and a plurality of rotor blades, and excluding a flapping hinge journal, an improved rotor arrangement comprising a rotor head plate that is made of at least one fiber-reinforced composite material and that comprises a plurality of blade connection arms, a plurality of plate segments radially spaced from one another about the rotor axis, and a plurality of blade lead-lag dampers respectively interposed and connected between said blade connection arms and one of said plate segments, wherein:

said blade connection arms are connected respectively to the rotor blades and are elastically flexible for bending in a blade flapping direction, at least one plate segment is connected to and supports said blade connection arms respectively from two sides thereof radially spaced from the rotor axis, so that said blade connection arms are free to elastically bend in said blade flapping direction, said at least one plate segment includes mounting locations positioned respectively circumferentially offset from said blade connection arms, and said rotor head plate is rigidly connected to the rotor mast via said mounting locations.

22. The improved rotor arrangement of claim 21, wherein said one of said plate segments comprises two plate segment members arranged one above another in a direction parallel to the rotor axis, said motion dampers comprise elastomeric damping members, and each respective one of said blade connection arms is received and sandwiched between two of said elastomeric damping members which in turn are received and sandwiched between said two plate segment members.

23. In a rotary wing aircraft including a rotor mast rotatable about a rotor axis and a plurality of rotor blades, and excluding a flapping hinge journal, an improved rotor arrangement comprising a rotor head plate that is made of at least one fiber-reinforced composite material, and that comprises an integrally formed one-piece component integrally including a plurality of blade connection arms and at least one plate segment, wherein:

said fiber-reinforced composite material has a continuous fiber structure extending from said at least one plate segment into said blade connection arms, said blade connection arms are connected respectively to the rotor blades and are elastically flexible for bending in a blade flapping direction, said at least one plate segment is connected to and supports said blade connection arms respectively from two sides thereof radially spaced from the rotor axis, so that said blade connection arms are free to elastically bend in said blade flapping direction, said at least one plate segment includes mounting locations positioned respectively circumferentially offset from said blade connection arms, and said rotor head plate is rigidly connected to the rotor mast via said mounting locations.

24. A rotor head plate for connecting a plurality of rotor blades to a rotor mast of a rotary wing aircraft, said rotor head plate being made essentially of a fiber-reinforced composite material and comprising a circular or polygon-shaped first ring member, a circular or polygon-shaped second ring member arranged spaced radially inwardly and concentrically relative to said first ring member, and a plurality of blade connection arms that are connected to and extend radially between said first and second ring members and extend radially outwardly from said first ring member, wherein radially outer ends of said blade connection arms comprise blade connection locations adapted to have the rotor blades respectively connected thereto, and wherein said first ring member comprises, at positions circumferentially offset from said blade connection arms, rotor mounting locations at which said first ring member is adapted to be rigidly connected to the rotor mast.

25. The rotor head plate of claim 24, further comprising rotor blade lead-lag damper members respectively interposed and connected between said blade connection arms and at least one of said first ring member and said second ring member.

26. The rotor head plate of claim 24, having an integral one-piece structure essentially consisting of said first ring member, said second ring member and said blade connection arms.

27. A rotor head plate for connecting a plurality of rotor blades to a rotor mast of a rotary wing aircraft, said rotor head plate being made essentially of a fiber-reinforced composite material and comprising a circular or polygon-shaped first ring member and a plurality of blade connection arms extending radially outwardly from said first ring member, wherein said first ring member and said blade connection arms are integrally formed as a unitary component, wherein radially outer ends of said blade connection arms comprise blade connection locations adapted to have the rotor blades respectively connected thereto, and wherein said first ring member comprises, at positions circumferentially offset from said blade connection arms, rotor mounting locations at which said first ring member is adapted to be rigidly connected to the rotor mast.

28. A rotor head plate for connecting a plurality of rotor blades to a rotor mast of a rotary wing aircraft, said rotor head plate being made essentially of a fiber-reinforced composite material and comprising a polygon-shaped first ring member and a plurality of blade connection arms extending radially outwardly from respective mid-points of straight sides of said polygon-shaped first ring member, wherein radially outer ends of said blade connection arms comprise blade connection locations adapted to have the rotor blades respectively connected thereto, wherein said first ring member comprises rotor mounting locations at which said first ring member is adapted to be rigidly connected to the rotor mast, and wherein said rotor mounting locations are laterally offset from said blade connection arms and are provided at corner junctions of respective adjacent ones of said straight sides.

* * * * *

UNITED STATES PATENT AND TRADEMARK OFFICE
CERTIFICATE OF CORRECTION

PATENT NO. : 6,039,538
DATED : Mar. 21, 2000
INVENTOR(S) : Bansemir

It is certified that error appears in the above-identified patent and that said Letters Patent is hereby corrected as shown below:

Col. 9, line 46, replace "one plate segment" by --one of said plate segments--.

Signed and Sealed this

Twenty-fourth Day of April, 2001

Attest:

NICHOLAS P. GODICI

Attesting Officer      Acting Director of the United States Patent and Trademark Office